(12) United States Patent
Yokota

(10) Patent No.: US 8,218,506 B2
(45) Date of Patent: Jul. 10, 2012

(54) COMMUNICATION SYSTEM SWITCHING METHOD, AND TERMINAL DEVICE USING THIS METHOD

(75) Inventor: Tomoyoshi Yokota, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 565 days.

(21) Appl. No.: 11/679,035

(22) Filed: Feb. 26, 2007

(65) Prior Publication Data

US 2007/0140276 A1   Jun. 21, 2007

Related U.S. Application Data

(62) Division of application No. 10/850,695, filed on May 20, 2004, now Pat. No. 7,212,832.

(30) Foreign Application Priority Data

May 30, 2003 (JP) .................................. 2003-155430

(51) Int. Cl.
*H04W 4/00* (2009.01)
(52) U.S. Cl. .......... 370/332; 370/338; 370/468; 455/436
(58) Field of Classification Search ................ 370/329, 370/331, 332, 333, 338, 468; 455/436, 437, 455/442, 450, 513, 553; 709/228
See application file for complete search history.

(56) References Cited

U.S. PATENT DOCUMENTS

| | | | | |
|---|---|---|---|---|
| 5,752,187 | A | * | 5/1998 | Frank et al. .................... 455/428 |
| 5,930,712 | A | * | 7/1999 | Byrne et al. .................... 455/436 |
| 6,026,301 | A | * | 2/2000 | Satarasinghe ................. 455/436 |
| 6,112,093 | A | * | 8/2000 | Nordlund ....................... 455/450 |
| 6,119,003 | A | | 9/2000 | Kukkohovi |
| 6,122,514 | A | | 9/2000 | Spaur et al. |
| 6,516,192 | B1 | | 2/2003 | Spaur et al. |
| 6,757,520 | B2 | | 6/2004 | Attar et al. |

(Continued)

FOREIGN PATENT DOCUMENTS

JP   2001-507895 A   6/2001

(Continued)

OTHER PUBLICATIONS

Taro Yokoyama et al., Vertical Handover Scheme between a Wireless LAN and a PHS for Stored Media Transmission, The Institute of Electronics, Information and Communication Engineers Technical Research Report, Oct. 27, 2000, vol. 100, No. 398, p. 55-59, CQ2000-47.

(Continued)

*Primary Examiner* — Andrew Lai
(74) *Attorney, Agent, or Firm* — DLA Piper LLP (US)

(57) ABSTRACT

A W-LAN communication unit, a personal handyphone communication unit and an EV-DO communication unit include communication functions corresponding to their communication systems. A W-LAN quality measurement unit detects a value corresponding to RSSI, which is the reception power. An EV-DO quality measurement unit periodically obtains EV-DO quality values. A throughput measurement unit measures the throughput values for the individual communication systems. A condition setting unit designates a condition for the selection of the W-LAN communication unit, the personal handyphone communication unit or the EV-DO communication unit. A threshold value storage unit stores threshold values. A first determination unit compares the throughput values for the W-LAN and the RSSI with threshold values. A second determination unit compares the EV-DO quality values with threshold values. And a selector performs the switching of communication systems.

7 Claims, 9 Drawing Sheets

U.S. PATENT DOCUMENTS

| | | | |
|---|---|---|---|
| 6,845,238 B1 | 1/2005 | Muller | |
| 7,023,822 B1* | 4/2006 | Czaja et al. | 370/332 |
| 7,039,027 B2 | 5/2006 | Bridgelall | |
| 7,039,410 B2* | 5/2006 | Jovanovic | 455/444 |
| 2001/0044322 A1* | 11/2001 | Raaf | 455/561 |
| 2002/0147819 A1* | 10/2002 | Miyakoshi et al. | 709/228 |
| 2002/0196755 A1 | 12/2002 | Hidaka et al. | |
| 2002/0197959 A1 | 12/2002 | Attar et al. | |
| 2003/0114158 A1* | 6/2003 | Soderbacka et al. | 455/436 |
| 2004/0053606 A1* | 3/2004 | Artamo et al. | 455/422.1 |
| 2004/0170191 A1* | 9/2004 | Guo et al. | 370/468 |

FOREIGN PATENT DOCUMENTS

| | | |
|---|---|---|
| JP | 2002-300644 | 10/2002 |
| JP | 2002-345019 A | 11/2002 |
| JP | 2003-509982 A | 3/2003 |
| KR | 2002-0086245 | 11/2002 |
| WO | 98/29975 A2 | 7/1998 |
| WO | 01/20942 A1 | 3/2001 |
| WO | 02/054820 | 7/2002 |
| WO | 02054820 A2 | 7/2002 |

OTHER PUBLICATIONS

Takashi Shono et al., Increase in Channel Capacity on Seamless Inter-System Handover Using Software Defined Radio, 2001, The Institute of Electronics, Information and Communication Engineers Communication Society Convention Collected Lectures and Papers, 2001, p. 303, B-5-17.

Japanese language office action and its English translation for corresponding Japanese application No. 2003-155430 lists the references above.

European Search Report for corresponding European application 08101830.1-2412 lists the references above.

* cited by examiner

FIG. 3

| CASE | SINR | DRC | TRANSMISSION OUTPUT | DRCLock | RSSI | RTT | W-LAN-RTT | W-LAN-RSSI |
|------|------|-----|---------------------|---------|------|-----|-----------|------------|
| 1 | A1 | B1 | C1 | D1 | E1 | — | — | — |
| 2 | — | — | — | — | — | — | G | H |
| 3 | A2 | B2 | C2 | D2 | E2 | — | — | — |
| 4 | A3 | B3 | C3 | D3 | E3 | F | — | — |

78

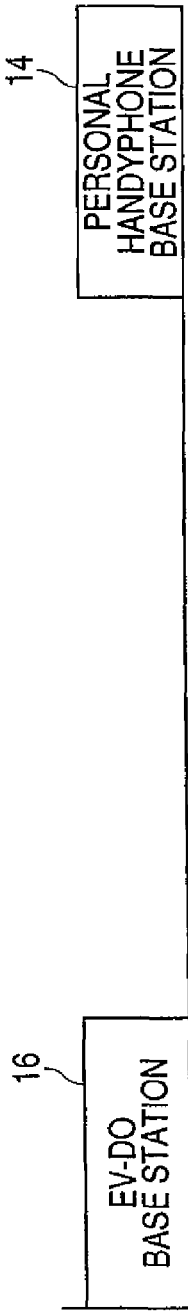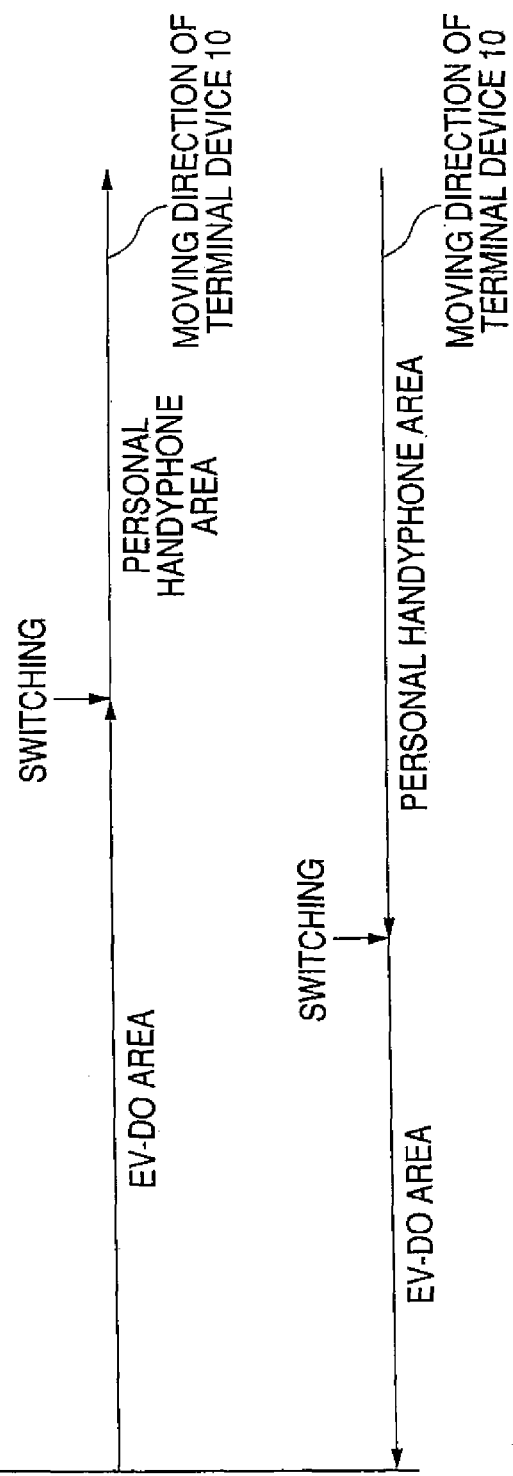
FIG. 7A
FIG. 7B
FIG. 7C

FIG. 9

| SYSTEM | THROUGHPUT |
|---|---|
| W-LAN | 5Mbps |
| EV-DO | 1Mbps |
| PERSONAL HANDYPHONE | 32kbps |

76

COMMUNICATION SYSTEM SWITCHING METHOD, AND TERMINAL DEVICE USING THIS METHOD

CROSS-REFERENCE TO THE RELATED APPLICATIONS

This is a divisional of application Ser. No. 10/850,695 filed May 20, 2004, the entire contents of which are incorporated by reference. This application also claims benefit of priority under 35 U.S.C. §119 to Japanese Application No. 2003-155430 filed May 30, 2003, the entire contents of which are incorporated by reference.

BACKGROUND OF THE INVENTION

1. Field of the Invention

The present invention relates to a communication system switching method. The present invention particularly relates to the communication system switching method of switching from a communication system to another different communication system, and a terminal device using the method.

2. Description of the Related Art

Recently, cdma2000 1x-EV DO (hereinafter referred to as EV-DO) has been developed as a next-generation high-rate radio communication system. The EV-DO system is a new version, which is specialized for the purpose of data communication and increased in transmission rate, of the cdma2000 1x system, which is an extended version (third generation system) of the cdmaOne system. "EV" means evolution, and "DO" means data only.

The EV-DO system is approximately the same as the cdma2000 1x system in the configuration of a radio interface of an uplink channel from a radio communication terminal to a base station. As for the configuration of the radio interface of a downlink channel from a base station to a radio communication terminal, whereas the bandwidth of 1.23 MHz is the same with that of the cdma2000 1x system, the modulation method and the multiplexing method are much different from those of the cdma2000 1x system. As for the modulation method, whereas QPSK and HPSK are used In the cdma2000 1x system, QPSK, 8-PSK, or 16QAM is selectively used in the EV-DO system according to a radio receive state of a downlink channel of a radio communication terminal. As a result, a high transmission rate with low error resistance is used when the radio receive state is good, and a low transmission rate with high error resistance is used when the radio receive state is bad.

As for the multiplexing method for enabling multiple communications from one base station to a plurality of radio communication terminals, TDMA (Time Division Multiple Access) is employed in which communications with a plurality of radio communication terminals are performed in such a manner that time is divided in units of 1/600 second, a communication is performed with one radio communication terminal in each unit time, and the radio communication terminal to be communicated is switched every unit time, rather than CDMA (Code Division Multiple Access) which is employed in the cdmaOne system and the cdma2000 1x system.

A radio communication terminal measures a carrier-to-interference power ratio (hereinafter abbreviated as CIR) of a pilot signal as an index of a radio receive state of a downlink channel from a base station to be communicated, predicts a radio receive state during the next reception time slot on the basis of a variation of the CIR, and notify "a maximum transmission rate which enables to receive with a error ratio that is lower than a predetermined rate", which is expected from the predicted radio receive state to the base station as data rate control bits (hereinafter referred to as DRC) predetermined. The predetermined error rate is usually set to about 1% though it depends on the system design. The base station receives the DRCs from a plurality of radio communication terminals, and a scheduler function in the base station determines with which radio communication terminal is to communicate in each division unit time. Basically, as high a transmission rate as possible is decided on the basis of a DRC sent from each radio communication terminal and is used for a communication with it.

With the above configuration, the EV-DO system enables a maximum transmission rate of 2.4 Mbps (mega-bits per second) per sector in a downlink channel. This transmission rate is the sum of amounts of data communications from one base station to a plurality of radio communication terminals in one frequency band and in one of a plurality of sectors (usually, a plurality of sectors exist). The transmission rate increases if a plurality of frequency bands is used.

JP-A-2002-300644 is referred to as a related art.

In the case of that the radio communication terminal can employ not only the EV-DO system but also another radio communication system, such as a wireless LAN system (hereinafter "W-LAN") or a personal handyphone system, and one of these radio communication systems is selected to employ actually. When the radio communication terminal is used, a criterion used to select a radio communication system to be used is important in order to satisfy the general user request for a "stable communication at a high transmission rate". Especially, in the case that the W-LAN, the EV-DO system or the personal handyphone system is available in the radio communication terminal, and besides, the maximum transmission rates greatly differ by about 100 times, e.g., from 11 Mbps of the W-LAN based on IEEE802.11b to 128 kbps of the personal handyphone systems the actual transmission rate will be greatly varied in accordance with the difference of switching methods. In order to meet the above request under this condition, the criterion for switching must be changed between when the transmission rate of the currently employed communication system is higher than the transmission rate of another communication system to be selected, and when the transmission rate of the current system is lower than the transmission rate of another communication system to be selected.

Since the transmission characteristic of a radio communication system greatly depends on the quality of a radio transmission path (hereinafter "transmission path quality") in general, the switching between the radio communication systems is determined based on the transmission path quality. However, when radio communication systems to be selected include a system, such as the EV-DO system, in which the transmission rate, the communication method and the transmission output differ between the uplink line and the downlink line, it is preferable that the transmission path qualities of the uplink line and the downlink line be measured independently. On the other hand, the radio communication terminal cannot measure the transmission path quality of the uplink line while the radio communication terminal can measure the transmission path quality of the downlink line. In addition, unless a new control signal is used in the radio communication system in consideration of easiness of feasibility, the transmission path quality of the uplink line is not notified from the base station. Therefore, it is more difficult to obtain the transmission path quality of the uplink line. Further, when the terminal device travels between the areas covered by different radio communication systems, it is preferable, in consideration of the stabilization of communication, that the radio communication systems are not be switched within a short period of time, and that hysteresis is provided for the switching control.

SUMMARY OF THE INVENTION

An object of the present invention is to provide a communication system switching method of switching to a system of which the transmission rate and stability are appropriate among a plurality of radio communication systems, and a terminal device using the method.

The invention provides a terminal device has: a first transmission path quality acquisition unit for obtaining a value of a transmission path quality of a first communication system being used; a first throughput acquisition unit for obtaining a first value corresponding to a throughput value of the first communication system; a second throughput acquisition unit for obtaining a second value corresponding to a throughput value of a second communication system to which enables to be switched from the first communication system; a threshold value determination unit for determining a threshold value regarding the transmission path quality based on the first value and the second value; and a switching decision unit for deciding to switch from the first communication system to the second communication system based on the threshold value and the value of the transmission path quality.

The "first value corresponding to the throughput" and the "second value corresponding to the throughput" may actually be throughput values, or may include a reception level, so long as the throughput values can be estimated based on the first value and the second value. Further, the first and second values may not be obtained by actually being measured, and may be predetermined.

The "acquisition" may be actually performing a measurement, or may reading a value stored in a memory, i.e., a value to be targeted may be obtained.

According to the terminal device, since the threshold value regarding the transmission path quality is changed in accordance with the throughput values of the first communication system and the second throughput value, a communication system can be selected while taking the throughput value into account.

The communication speeds and the communication methods of the uplink line and the downlink line of the first communication system may be different from each other. Further, the first transmission path quality acquisition unit may obtain values of a plurality of transmission path qualities, the threshold value determination unit determines a plurality of threshold values corresponding to the plurality of transmission path qualities, and the switching decision unit decides to switch from the first communication system to the second communication system when one of the plurality of transmission path qualities satisfies a condition defined based on a threshold value corresponding to the plurality of transmission path quality.

The statement "condition defined based on the threshold value is satisfied" indicates that the value of the transmission path quality is equal to or greater than the threshold value when a condition of the threshold value or greater is satisfied, and that the value of the transmission path quality is equal to or smaller than the threshold value when a condition of the threshold value or smaller is satisfied. These conditions are set according to the setup.

The first transmission path quality acquisition unit may obtain, as the values of the plurality of transmission path qualities, values of transmission path qualities corresponding to the uplink line and the downlink line of the first communication system. The threshold value determination unit determines a threshold value according to which the switching decision unit easily switches from the first communication system to the second communication system as the threshold value when the second value is greater than the first value. The terminal device further has: a second transmission path quality acquisition unit for obtaining a value of a transmission path quality of the second communication system. The switching decision unit decides to switch from the first communication system to the second communication system, regardless of the value of the transmission path quality of the first communication system, when the second value is greater than the first value and when the value of the transmission path quality of the second communication system satisfies a condition defined based on a predetermined threshold value.

The statement "values of the transmission path qualities corresponding to the uplink line and the downlink line" naturally includes the values of the transmission path qualities of the uplink and downlink lines. However, other values such as transmission output values can be employed so long as the values of the transmission path qualities for the uplink and the downlink lines can be estimated.

The invention also provides a terminal device has: a priority data acquisition unit for obtaining data regarding a first priority corresponding to a first communication system being used and data regarding a second priority corresponding to a second communication system to which enables to be switched from the first communication system; a transmission path quality acquisition unit for obtaining a value of a transmission path quality of a communication system to which a high priority is set; a switching criterion decision unit for determining a switching criterion for which the value of the transmission path quality should be determined based on the first priority; and a switching decision unit for deciding to switch from the first communication system to the second communication system based on the switching criterion and the value of the transmission path quality.

The communication speeds and communication methods of an uplink line and a downlink line of the communication system to which a high priority is set are respectively different from each other. The higher throughput a communication system has, the higher priority the communication system has.

The term "priority" is the order of communication systems defined based on a predetermined criterion. The priority level may be set arbitrarily, e.g., a high priority may be provided for a communication system having a large throughput value, a communication system having a large service area, or a communication system providing a low communication fee or a fixed communication rate. Furthermore, the priority may be set by the user of the terminal device, or by a communication service provider.

For a "communication system having a high throughput", the throughput value may be a actual throughput value or a throughput value defined in accordance with communication standards. The throughput may be a throughput value defined by a standard.

According to the terminal device, since the switching criterion of the communication system is decided based on the first priority of the first communication system, and the switching of the communication system is decided based on the switching criterion, the switching of the communication systems can be performed while taking into account the priority of the communication system.

The transmission path quality acquisition unit obtains values of a plurality of transmission path qualities. In a case that a highest priority is set to the first communication system, the switching criterion decision unit determines the switching criterion so that the switching decision unit decides to switch from the first communication system to the second communication system when one of the values of the transmission path qualities satisfies a predetermined reference value. In a case that a lowest priority is set to the first communication system, the switching criterion decision unit determines the switching criterion so that the switching decision unit decides to switch from the first communication system to the second communication system when all of the values of the transmission path qualities satisfy the predetermined reference value. The transmission path quality acquisition unit obtains, as the values of the plurality of transmission path qualities, values of transmission path qualities corresponding to the uplink line and the downlink line of the communication system to which a high priority is set. The predetermined reference value is changed based on the first communication system.

The term "reference value" refers to a value to be compared with the value of the transmission path quality, and corresponds to a threshold value.

The invention also provides a communication system switching method including the steps of: obtaining a value of a transmission path quality of a first communication system being used, and a first value corresponding to a throughput value of the first communication system; obtaining a second value corresponding to a throughput value of a second communication system to which enables to be switched from the first communication system; and deciding to switch from the first communication system to the second communication system based on a threshold value regarding a transmission path quality determined based on the first value and the second value, and the value of the transmission path quality.

The invention also provides a communication system switching method including the steps of: being setting a first priority corresponding to the first communication system being used and a second priority corresponding to a second communication system to which enables to be switched from the first communication system; deciding to switch from the first communication system to the second communication system based on a switching criterion for communication system determined based on the first priority, and a value of a transmission path quality of a communication system to which a high priority is set.

Further, an arbitrary combination of these components and the representation used for the present invention can be provided by a method, an apparatus, a system and a recording medium or a computer program, and this case is also effective as the mode of the present invention.

BRIEF DESCRIPTION OF THE DRAWINGS

FIG. 3 is a diagram showing the data structure of a threshold value storage unit in FIG. 2;

FIGS. 7A to 7C are diagrams showing the switching timing concept when the terminal device reciprocates between the EV-DO area in FIG. 1 and an area for another radio communication system;

FIG. 9 is a diagram showing the data structure for throughput values stored in accordance with a second embodiment of the present invention.

DETAILED DESCRIPTION OF THE PREFERRED EMBODIMENTS

First Embodiment

Figure 1:
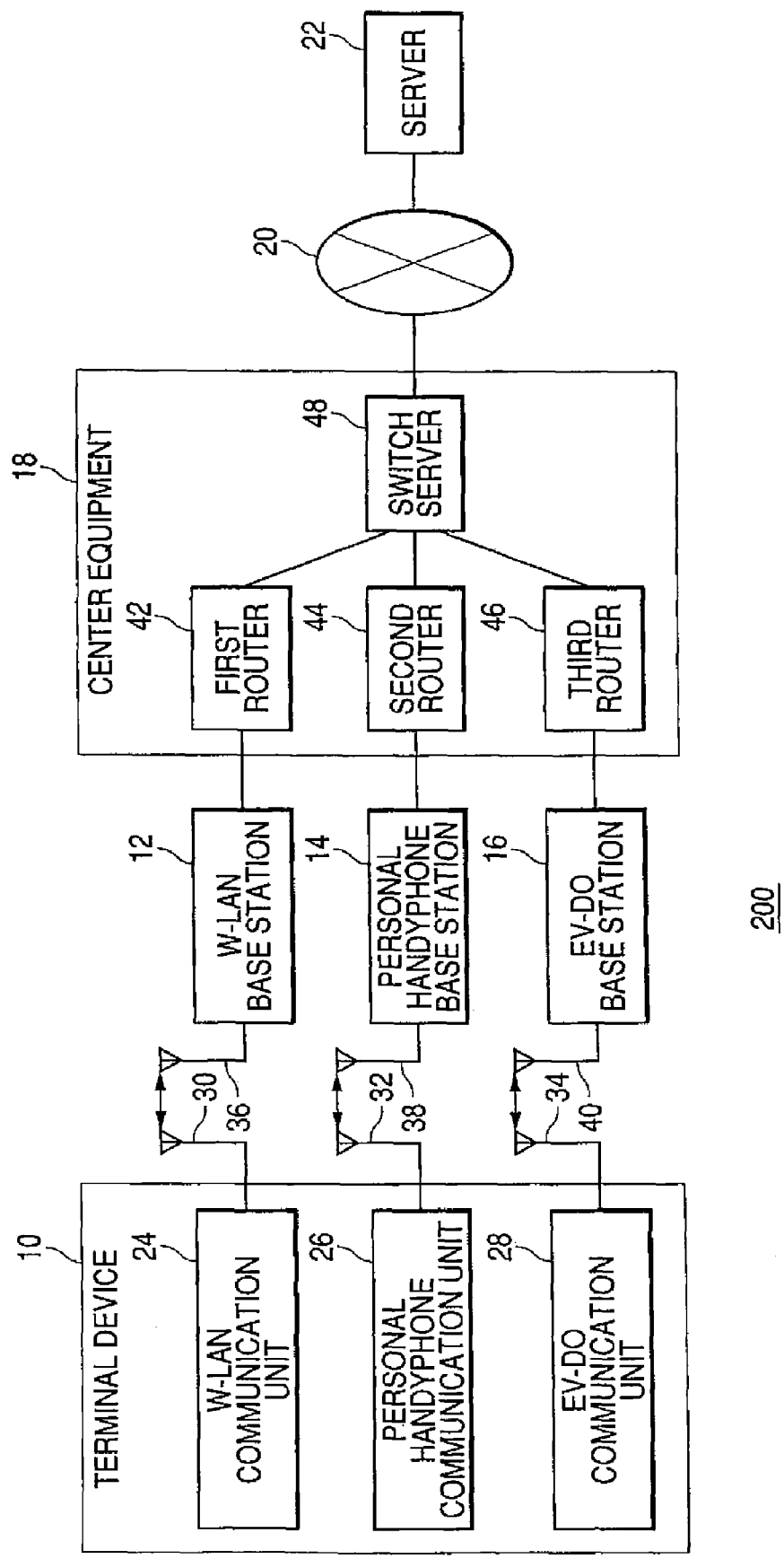
FIG. 1 is a diagram showing the configuration of a communication system according to a first embodiment of the present invention.

A first embodiment relates to a terminal device that can perform communication while switching between the W-LAN, the EV-DO system and a personal handyphone system. An explanation will now be given, mainly for the EV-DO system, in which a maximum transmission rate is in the middle of those of these three radio communication systems, and in which, the communication system differences are the greatest along the uplink line and the downlink line. That is, a high priority is previously set for the EV-DO system by a user or a communication service provider, and a low priority is set for the other radio communication systems, such as the W-LAN and the personal handyphone system. In the case of deciding to switch from the EV-DO system to another radio communication system, i.e., switching from a radio communication system having a high priority to one having a low priority, the terminal device of the embodiment measures the throughput values of each system, as well as a plurality of transmission path qualities (all or one of the values for the transmission path qualities is called an "EV-DO quality value") that correspond to the uplink and downlink lines of the EV-DO system. When the throughput value of a radio communication system to be selected is lower than the throughput value of the EV-DO system, a predetermined threshold value (all or one of the threshold values is called a "first threshold value") is set with respect to the EV-DO quality values, and the switching decision is made when any of the EV-DO quality values satisfies the first threshold value.

On the other hand, when the throughput value of the radio communication system to be selected is higher than the throughput value of the EV-DO system and the quality of this radio communication system is lower than a predetermined criterion, a threshold value (all or one of the threshold values is called a "second threshold value) that the EV-DO quality values can satisfy more easily than the first threshold value is set with respect to the EV-DO quality value, the switching decision is made when any of the EV-DO quality values satisfies the second threshold value. Further, when the throughput value of the radio communication system to be selected is higher than the throughput value of the EV-DO system, and when the quality of the radio communication system is equal to or higher than a predetermined reference, the switching decision is made regardless of the EV-DO quality values.

In the case of switching from a radio communication system to the EV-DO system, i.e., switching from a radio communication system having a low priority to a radio communication system having a high priority, the terminal device of the embodiment sets a predetermined threshold value (all or one of the threshold values is called a "third threshold value") with respect to the EV-DO quality values. When all the EV-DO quality values satisfy, the third threshold value, the switching decision is made. As far as all the EV-DO quality values does not satisfy the third threshold value, the switching is not performed. Therefore, the radio communication system is switched to the EV-DO system only when the quality of the EV-DO system is better stabilized.

FIG. 1 is a diagram showing a communication system 200 according to the first embodiment. The communication system 200 has a terminal device 10, a W-LAN base station 12, a personal handyphone base station 14, an EV-DO base station 16, a center equipment 18, a network 20 and a server 22. The terminal device 10 includes a W-LAN communication unit 24, a W-LAN antenna 30, a personal handyphone communication unit 26, a personal handyphone antenna 32, an EV-DO communication unit 28 and an EV-DO antenna 34. The W-LAN base station 14 includes a personal handyphone base station antenna 28. The EV-DO base station 16 includes an EV-DO base station antenna 40. The center equipment 18 includes a first router 42, a second router 44 and a third router 46, and a switch server 48.

The terminal device 10 is a mobile terminal having a communication function. The terminal device 10 includes a plurality of communication means such as the W-LAN communication unit 24, the personal handyphone communication unit 26 and the EV-DO communication unit 28. The terminal device 10 does not perform simultaneous communication using the W-LAN communication unit 24, the personal handyphone communication unit 26 and the EV-DO communication unit 28, but rather, while the terminal device 10 monitors the transmission path qualities of these units and automatically selects an optimal communication unit to be used for communication. The terminal device 10 may be configured as a single device, and may be a PC, into which communication cards are inserted, that individually serve as the W-LAN communication unit 24, the personal handyphone communication unit 26 and the EV-DO communication unit 28. In this case, the selection of the communication unit is performed by a PC installed software program.

Further, the W-LAN communication unit 24, the personal handyphone communication unit 26 and the EV-DO communication unit 28 respectively include the W-LAN antenna 30, the personal handyphone antenna 32 and the EV-DO antenna 34.

The W-LAN base station 12 is compatible with the W-LAN communication system, and communicates with the W-LAN communication unit 24 through the W-LAN base station antenna 36. The personal handyphone base station 14 is compatible with the personal handyphone system, and communicates with the personal handyphone communication unit 26 through the personal handyphone base station antenna 38. The EV-DO base station 16 is compatible with the EV-DO system, and communicates with the EV-DO communication unit 28 through the EV-DO base station antenna 40.

The switch server 48 has a function for switching between the W-LAN base station 12, the personal handyphone base station 14 and the EV-DO base station 16 in accordance with the communication means selected by the terminal device 10. In accordance with the selection made by the switch server 48, the first router 42, the second router 44 or the third router 46 performs a routing based on an IP address allocated to the W-LAN base station 12, the personal handyphone base station 14 or the EV-DO base station 16. A process such as IPsec (IP security protocol) may be performed, as necessary, to increase the security between the switch server 48 and the W-LAN communication unit 24, the personal handyphone communication unit 26 or the EV-DO communication unit 28. The switch server 48 itself is connected to the server 22 through the network 20.

Figure 2:
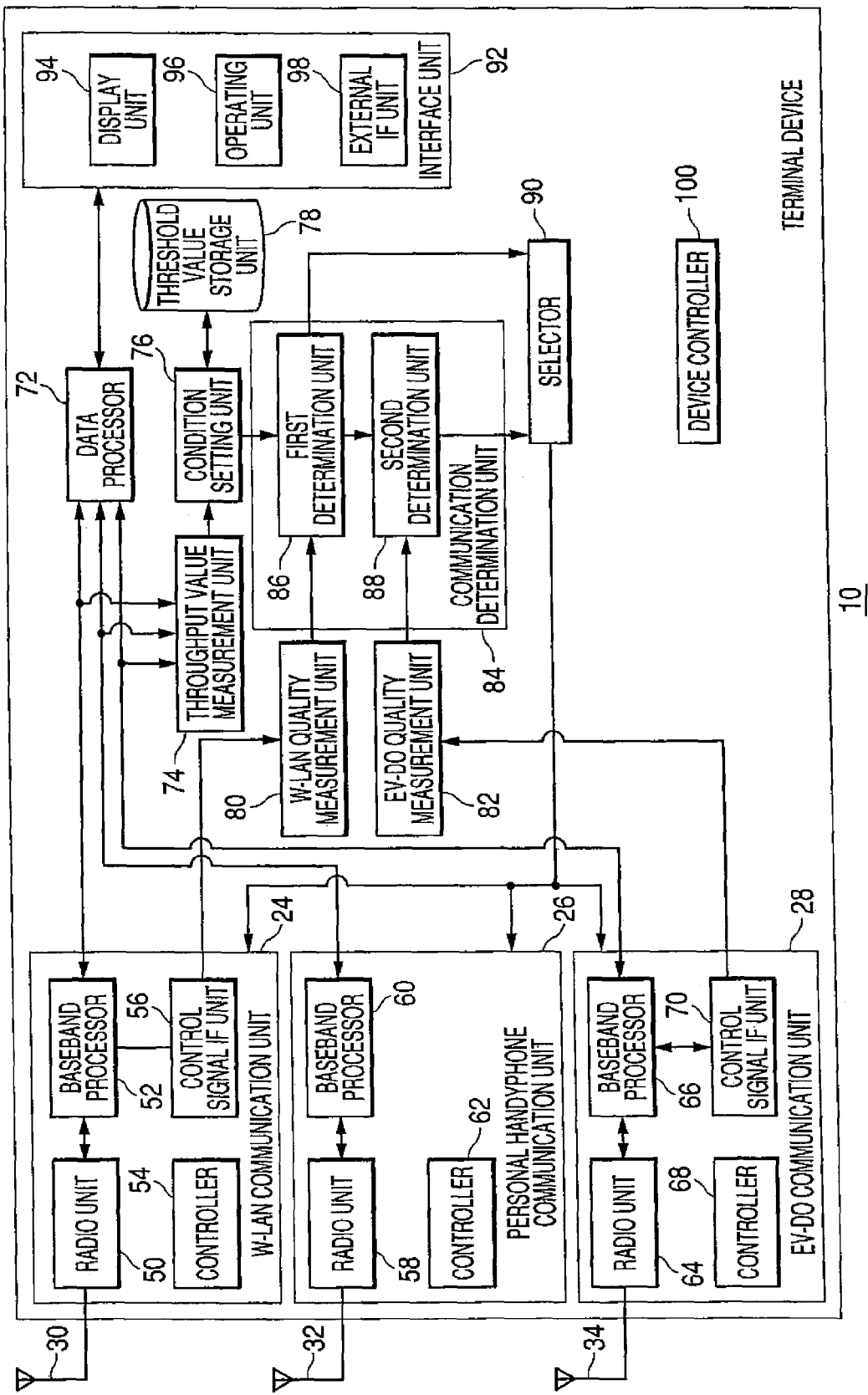
FIG. 2 is a diagram showing the configuration of a terminal device in FIG. 1.

FIG. 2 is a diagram showing the configuration of the terminal device 10. The terminal device 10 has the W-LAN communication unit 24, the personal handyphone communication unit 26, the EV-DO communication unit 28, a data processor 72, a throughput measurement unit 74, a condition setting unit 76, a threshold value storage unit 78, a W-LAN quality measurement unit 80, an EV-DO quality measurement unit 82, a communication determination unit 84, a selector 90, an interface unit 92 and a device controller 100. The W-LAN communication unit 24 includes a radio unit 50, a baseband processor 52, a controller 54 and a control signal IF unit 56. The personal handyphone communication unit 26 includes a radio unit 58, a baseband processor 60 and a controller 62. The EV-DO communication unit 28 includes a radio unit 64, a baseband processor 66, a controller 68 and a control signal IF unit 70. The communication determination unit 84 includes a first determination unit 86 and a second determination unit 88. The interface unit 92 has a display unit 94, an operating unit 96 and an external IF unit 98.

The radio unit 50 has a frequency conversion function for converting a W-LAN radio frequency signal and a baseband signal, an amplification function for amplifying the signals, and conversion functions for AD conversion and DA conversion. The baseband processor 52 performs the modulation and demodulation of a baseband signal. In the case that the W-LAN conforms to IEEE802.11b, the baseband processor 52 has a spreading function and a despreading function. In the case that the W-LAN conforms to IEEE802.11a or IEEE802.11g, the baseband processor 52 has a fast Fourier transform function and a fast inverse Fourier transform function.

The control signal IF unit 56 outputs, as a value for a transmission path quality described later, a predetermined control signal processed by the W-LAN communication unit 24. The controller 54 performs a timing control for the W-LAN communication unit 24 and generates a control signal.

The radio unit 58, the baseband processor 60 and the controller 62 perform processes corresponding to the radio unit 50, the baseband processor 52 and the controller 54 for the personal handyphone system. For example, the baseband processor 60 performs modulation and demodulation using $\pi/4$ shift QPSK.

The radio unit 64, the baseband processor 66, the control signal IF unit 70 and the controller 68 perform processes corresponding to the radio unit 50, the baseband processor 52, the control signal IF unit 56 and the controller 54 for the EV-DO system. For example, the baseband processor 66 performs a CDMA process for the uplink line and a TDMA process for the downlink line, while the control signal IF unit 70 outputs EV-DO quality values described later.

The data processor 72 exchanges data through the interface unit 92 with the baseband processor 52, the baseband processor 60 or the baseband processor 66.

The display unit 94 corresponds to a display device on which predetermined data are displayed. The operating unit 96 corresponds to a keyboard used when a user enters predetermined processes. The external IF unit 98 is an interface for exchanging data with an external device.

The control signal IF unit 56 outputs the control signals. The W-LAN quality measurement unit 80 detects a signal indicating RSSI (Receive Signal Strength Indicator) which shows power of a received signal, and defines a value of the signal as the value of a transmission path quality of the W-LAN (hereinafter "W-LAN-RSSI").

The EV-DO quality measurement unit 82 periodically obtains, from the control signal IF unit 70, the DV-DO quality values which includes SINR (Signal to Interference and Noise Ratio), DRC (Data Rate Control) information, the RSSI, a transmission output, and DRC Lock information. In order to obtain these data, the EV-DO quality measurement unit 82 transmits a log acquisition request to the control signal IF unit 70. In addition, the EV-DO quality measurement unit 82 parameterizes the EV-DO quality value consisting of these five elements to store these parameterized values at predetermined intervals, and then performs a statistical process, e.g., obtains a mean value, for these values.

The transmission path quality for the downlink line can be determined by using the SINR, the DRC information and the RSSI among the EV-DO quality values. In this case, the SINR represents the ratio between reception levels of a desired signal and an interference signal or noise. The DRC information is, as is described above, the transmission rate of the downlink line requested to the EV-DO base station 16 on the basis of past fluctuations of the CIR and the RSSI. On the other hand, the transmission path quality of the uplink line can be determined by using the transmission output and the DRC Lock information. Generally, since the transmission output level increases as the distance increases between the terminal device 10 and the EV-DO base station 16, the transmission path quality tends to degrade as the transmission output level increases. A ratio of error-less packets received by the EV-DO base station 16 is determined on the basis of statistics of the DRC Lock information.

The throughput measurement unit 74 transmits an echo command having a data length of 1000 bytes defined as an access control command to the switch server 48 for the W-LAN, the personal handyphone system and the EV-DO system and receives the echo command which was previously transmitted from the throughput measurement unit 74 and then transmitted from the switch server 48, that is, the throughput measurement unit 74 performs the echo back, to measure the RTT (Round Trip Time). The throughput measurement unit 74 then employs the measured value as a throughput value. A predetermined conversion may be performed for the measured RTT. Thereafter, the throughput value and the RTT are not particularly distinguished from each other and are regarded as being identical.

The condition setting unit 76 sets a condition for the selection of one of the W-LAN communication unit 24, the personal handyphone communication unit 26 and the EV-DO communication unit 28. First, in order to compare with the throughput values measured by the throughput measurement unit 74, the condition setting unit 76 classifies the conditions as follows to establish a detailed comparison criterion, i.e., a switching criterion for communication systems. The condition setting unit 76 classifies rough two group according to whether the currently used communication means is the EV-DO communication unit 28 or another communication means. When the currently employed communication means is the EV-DO communication unit 28, i.e., when a communication means having a high priority is employed, an area fringe determination condition is designated. When the currently employed communication means is another communication means, i.e., when a communication means having a low priority is employed, an intra-area determination condition is designated. In addition, the area fringe determination condition is further classified according to whether the communication means to be selected is the W-LAN communication unit 24 or the personal handyphone communication unit 26, i.e., whether the throughput value is higher or lower than that for of the EV-DO system. These conditions are respectively called a fast area fringe determination condition and a slow area fringe determination condition.

That is, the throughput value measured by the throughput measurement unit 74 and the priority for the currently employed communication means are employed to allocate the switching criterion to be determined to one of the fast area fringe determination condition, the slow area fringe determination condition and the intra-area determination condition. When the EV-DO communication unit 28 is employed, and when the W-LAN communication unit 24 and the personal handyphone communication unit 26 are both available, the W-LAN communication unit 24 having a higher throughput value is selected and is allocated as the fast area fringe determination condition. The determination logic differs between the area fringe determination condition and the intra-area determination condition. The threshold value related to the EV-DO quality value differs between the fast area fringe determination condition, the slow area fringe determination condition and the intra-area determination condition, which will be described in detail later.

The threshold value storage unit 78 stores a threshold value. The data structure for this unit is shown in FIG. 3. "Case" corresponds to the above described condition, case 1 corresponds to the slow area fringe determination condition, case 2 and case 3 correspond to the fast fringe determination condition, and case 4 corresponds to the intra-area determination condition. Threshold values corresponding to the EV-DO quality value, the RTT for the W-LAN (hereinafter "W-LAN-RTT") and the W-LAN-RSSI are stored for each case. The threshold value for case 1 corresponds to the first threshold value, the threshold value for case 3 corresponds to the second threshold value, and the threshold value for case 4 corresponds to the third threshold value. The condition setting unit 76 selects the threshold value based on the case.

When the fast area fringe determination condition is designated, the first determination unit 86 compares the W-LAN-RTT and the W-LAN-RSSI with threshold values G and H for case 2. When the W-LAN-RTT is equal to or smaller than the threshold value G and the W-LAN-RSSI is equal to or greater than the threshold value H, i.e., when it can be assumed that the communication state of the W-LAN is good, the first determination unit 86 decides to switch to the W-LAN having a higher throughput value.

The second determination unit 88 compares the EV-DO quality values with the threshold value. When the slow area fringe determination condition is set, the second determination unit 88 compares the EV-DO quality values with the threshold value for case 1. When any EV-DO quality value satisfies this condition, the second determination unit 88 decides to switch to the personal handyphone system. When the fast area fringe determination condition is set, the second determination unit 88 compares the EV-DO quality values with the threshold value for case 3. When any EV-DO quality value satisfies this condition, the second determination unit 88 decides to switch to the W-LAN. Under the fast area fringe determination condition, the throughput value is increased by changing the radio communication system. Under the slow area fringe determination condition, the throughput value is reduced. Therefore, the fast area fringe determination condition is preferable when changing the radio communication system. As a result, the threshold value for "case 3" is set to a value that satisfies the condition more easily than the threshold value for "case 1". Then, when the intra-area determination condition is set, the second determination unit 88 compares the EV-DO quality values and the RTT for the EV-DO system with the threshold value for case 4. When all the values satisfy the threshold value, the second determination unit 88 decides to switch to the EV-DO system.

The selector 90 switches between the W-LAN communication unit 24, the personal handyphone communication unit 26 and the EV-DO communication unit 28 in accordance with the switching decision made by the first determination unit 86 or the second determination unit 88.

The device controller 100 performs timing control or generates a control signal.

The configuration can be provided by hardware, i.e., by the CPU, the memory and other LSI provided for an arbitrary computer, or by software, i.e. a program having a reservation management function, for which memory is available. In the embodiment, function blocks are provided in coordination with the hardware and the software. Therefore, it can easily be understood by a person skilled in the art that these function blocks can be provided in various forms merely by using hardware or software, or by using hardware and software combinations.

Figure 4:
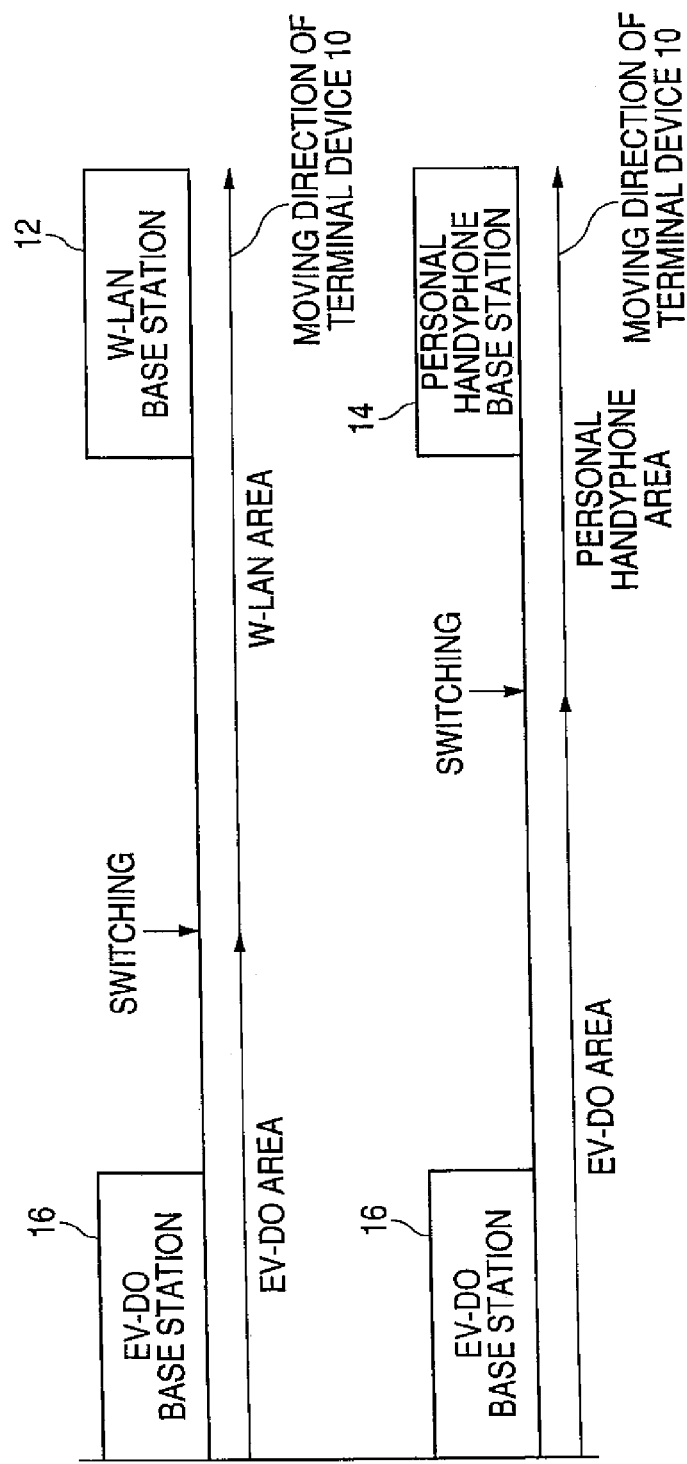
FIGS. 4A and 4B are diagrams showing the switching timing concept when the terminal device is moved from an EV-DO area in FIG. 1 to an area for another radio communication system.

FIGS. 4A and 4B are diagrams showing a switching timing concept for an event involving the movement of the terminal device 10 from the EV-DO area to another radio communication system area. To simplify the explanation, the EV-DO base station 16 and the W-LAN base station 12 or the personal handyphone base station 14 are located along a one-dimensional line. And, it is assumed that the terminal device 10 is being moved away from the EV-DO base station 16. Although the transmission outputs and the lowest reception sensitivity levels of the EV-DO base station 16, the W-LAN base station 12 and the personal handyphone base station 14 differ, it is presumed that these conditions have been standardized to simplify the comparison.

In FIG. 4A, the terminal device 10 is moved toward the W-LAN base station 12, i.e., this case corresponds to the fast area fringe determination condition. On the other hand, in FIG. 4B, the terminal device 10 is moved toward the personal handyphone base station 14, i.e., this case corresponds to the slow area fringe determination condition. As is apparent from a comparison of FIGS. 4A and 4B, the EV-DO system is more quickly changed to another communication system in FIG. 4A. The area for the EV-DO system in FIG. 4A is shorter than the W-LAN area, while the area for the EV-DO system in FIG. 4B is longer than the area for the personal handyphone. Thus, the EV-DO system in FIG. 4A is quickly changed to the faster W-LAN, while the faster EV-DO system in FIG. 4B can be employed for a longer time because the threshold values for "cases 2 and 3" and "case 1" differ.

Figure 5:
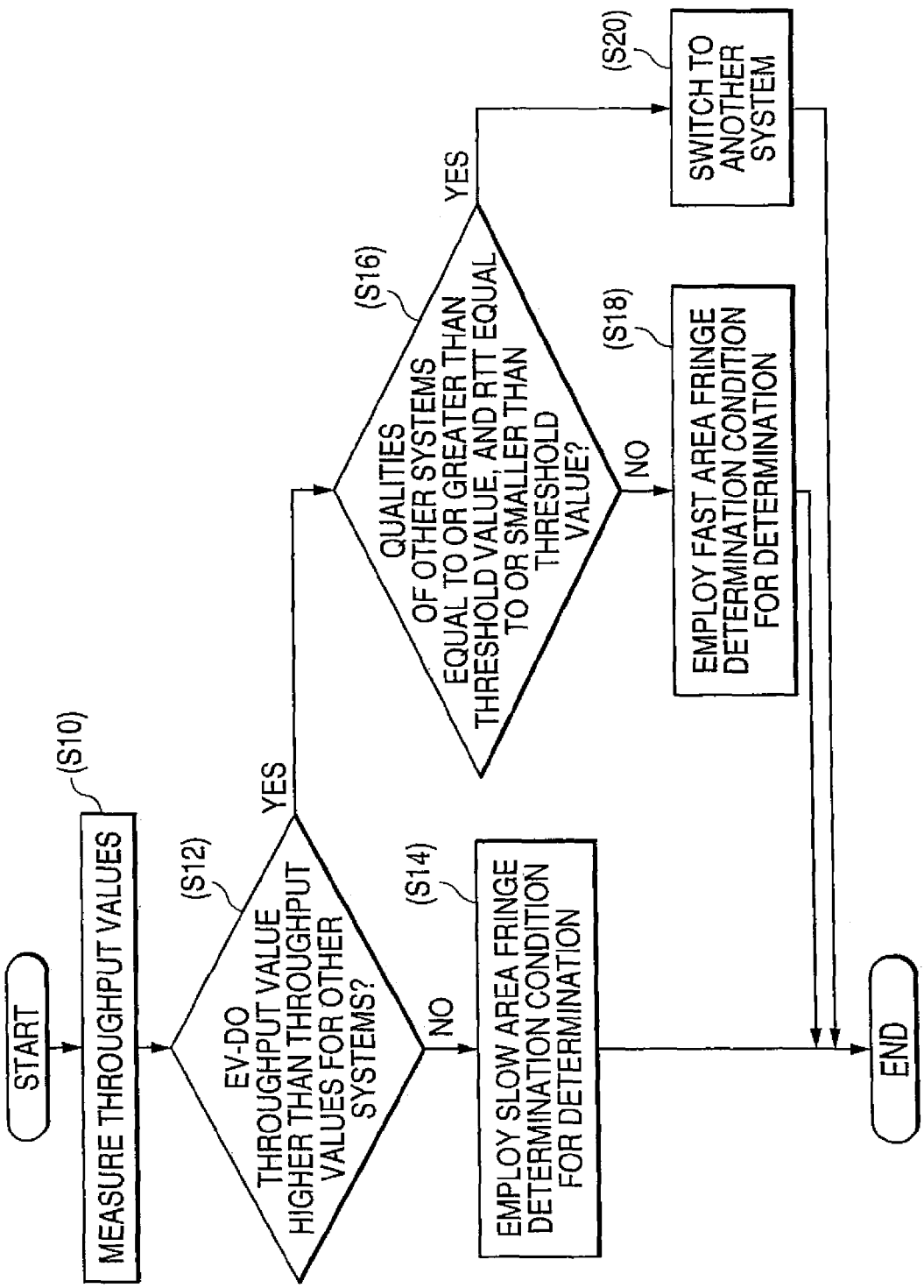
FIG. 5 is a flowchart showing the switching processing performed when the terminal device is moved from the EV-DO area to an area for another radio communication system.

FIG. 5 is a flowchart showing the switching processing performed when the terminal device 10 is moved from the EV-DO area to another radio communication area. The throughput measurement unit 74 measures the throughput values for the W-LAN communication unit 24, the personal handyphone communication unit 26 and the EV-DO communication unit 28 (S10). The condition setting unit 76 then compares the throughput value for each of these units (S12). When the throughput value for the EV-DO system is not higher than the throughput values for the other systems (N at S12), the second determination unit 88 designates a communication system for which the slow area fringe determination condition applies (S14). When the throughout value for the EV-DO is higher than the throughput values for either of the other systems (Y at S12), the first determination unit 86 compares the qualities of the other systems with the threshold value and compares the RTT with the threshold value (S16). When the qualities of the other systems are not equal to or greater than the threshold value, or the RTT is not equal to or smaller than the threshold value (N at S16), the second determination unit 88 performs the determination with the fast area fringe determination condition (S18). When the qualities of the other systems are equal to or greater than the threshold value and the RTT is equal to or smaller than the threshold value (Y at S16), it is switched from the EV-DO system to another system (S20) because it is assumed that the communication state of the other system is good.

Figure 6:
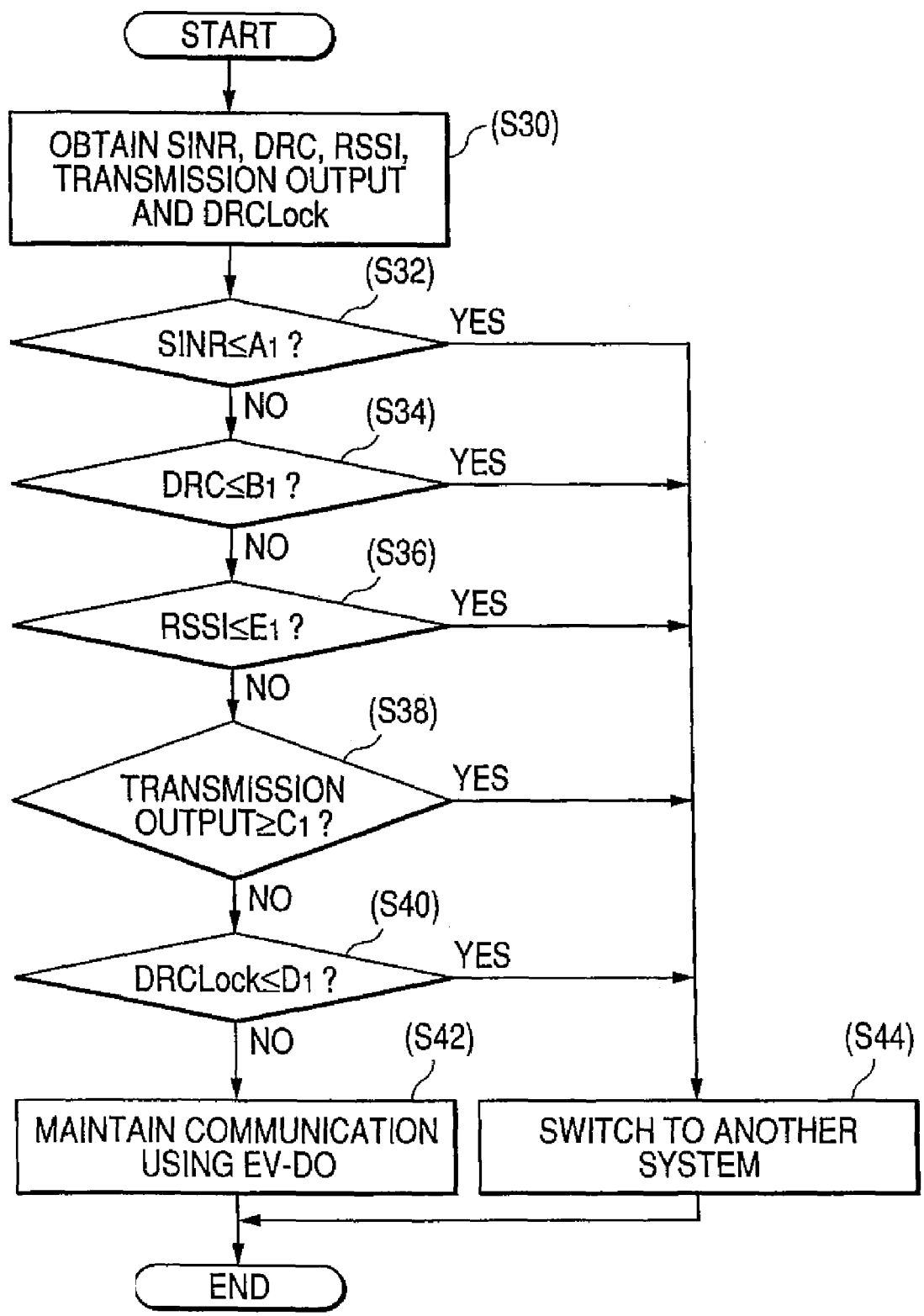
FIG. 6 is a flowchart showing the determination processing performed when a slow area fringe condition shown in FIG. 5 applies.

FIG. 6 is a flowchart showing the determination processing for which the slow area fringe determination condition applies. It is assumed that the threshold value for case 1 in the threshold value storage unit 78 is selected. The EV-DO quality measurement unit 82 obtains the SINR, the DRC information, the RSSI, the transmission output and the DRC Lock information (S30). When either the SINR is equal to or smaller than A1 (Y at S32), the DRC information is equal to or smaller than B1 (Y at S34), the RSSI is equal to or smaller than E1 (Y at S36), the transmission output is equal to or higher than C1 (Y at S38), or the DRC Lock is equal to or smaller than D1 (Y at S40), it is switched from the EV-DO system to another communication system (S44). On the other hand, when none of these conditions are satisfied (N at S32 to N at S40), the use of the communication system employing the EV-DO system is maintained (S42). The determination processing for the fast area fringe determination condition is the same flowchart as in FIG. 6, except that the threshold value for "case 3" is selected.

FIGS. 7A to 7C are diagrams showing the concept for the switching timing when the terminal device reciprocates between the EV-DO area and another radio communication area. It is assumed that, as shown in FIG. 7A, the EV-DO base station 16 and the personal handyphone base station 14 are located along a one-dimensional line. As shown in FIG. 7B, the terminal device 120 is moved from the EV-DO base station 16 toward the personal handyphone base station 14, i.e., this case corresponds to the slow area fringe determination condition. As shown in FIG. 7C, the terminal device 10 is moved from the personal handyphone base station 14 toward the EV-DO base station 16, i.e., this case corresponds to the intra-area determination condition. As is apparent from the comparison between FIGS. 7B and 7C, the EV-DO area is longer in FIG. 7A. That is, in the case of switching from the EV-DO system to another communication system, the EV-DO system is employed as long as possible. In the case of switching from another system to the EV-DO system, the EV-DO system is not used until the communication is better stabilized. Through this processing, even if the terminal device 10 travels between the position "switching" in FIG. 7B and the position "switching" in FIG. 7C, the communication system is not changed within a short period of time. Therefore, a more stable operation can be performed.

Figure 8:
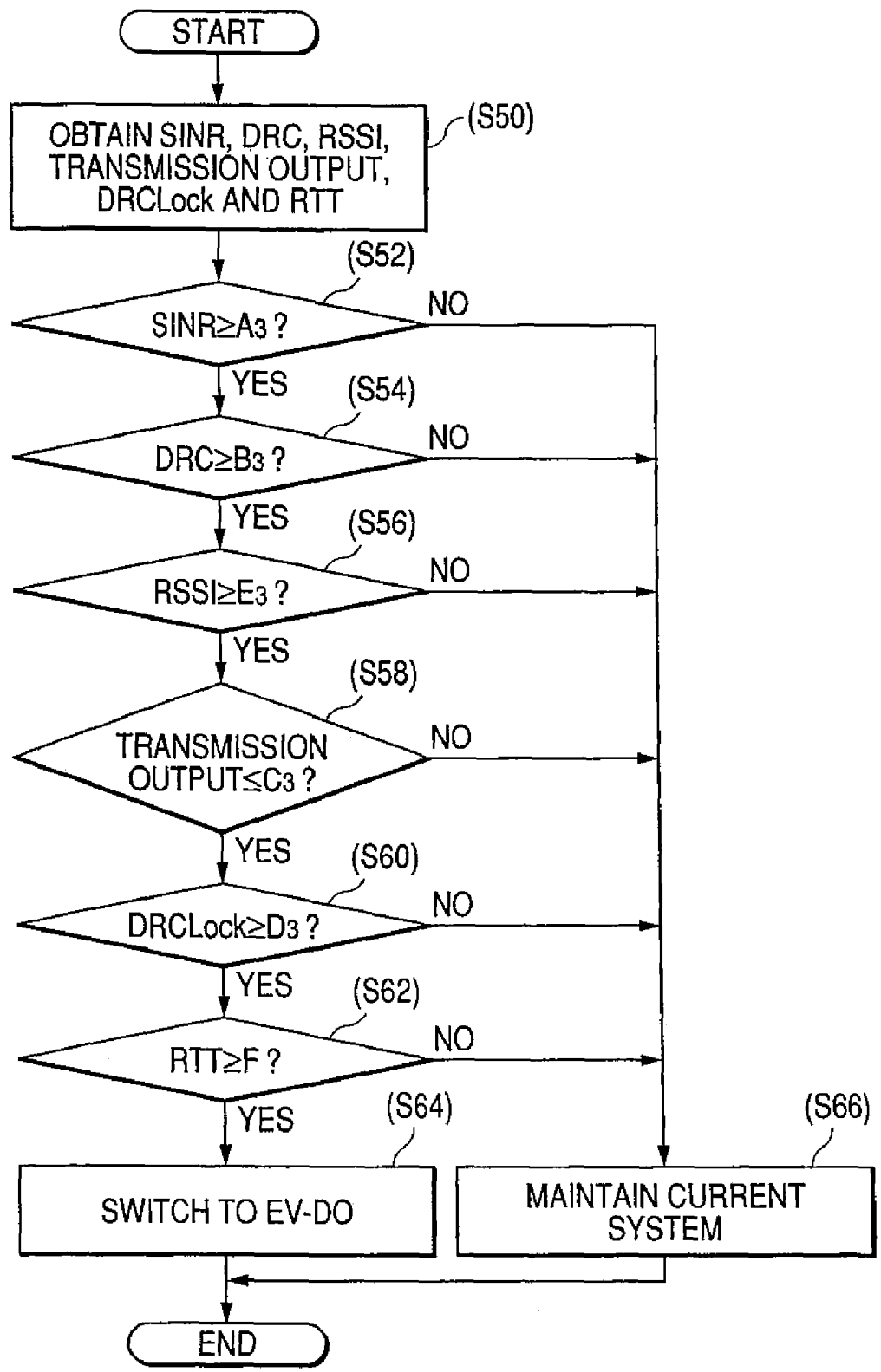
FIG. 8 is a flowchart showing the switching processing performed when an intra-area determination condition shown in FIG. 7 applies.

FIG. 8 is a flowchart showing the determination processing performed under the intra-area determination condition. It is assumed that the threshold value for case 4 in the threshold value storage unit 78 is selected. The EV-DO quality measurement unit 82 obtains the SINR, the DRC information, the RSSI, the transmission output and the DRC Lock information, and the throughput measurement unit 74 obtains the RTT (S50). When the SINR is equal to or greater than A3 (Y at S52), the DRC information is equal to or greater than B3 (Y at S54), the RSSI is equal to or greater than E3 (Y at S56), the transmission output is equal to or lower than C3 (Y at S58), the DRC Lock is equal to or greater than D3 (Y at S60) and the RTT is equal to or greater than F (Y at S62), it is switched from the currently employed communication system to the EV-DO system (S64). On the other hand, when neither of these conditions is satisfied (N at S52 to N at S62), the communication process performed by the current communication system is maintained (S66).

The operation of the terminal device 10 will now be described. It is assumed that the terminal device 10 is moved from the EV-DO area to the W-LAN area. The throughput measurement unit 74 measures the throughput values of the W-LAN communication unit 24, the personal handyphone communication unit 26 and the EV-DO communication unit 28. The condition setting unit 76 compares these throughput values, confirms that the throughput value for the W-LAN is higher than the throughput value of the EV-DO system, and obtains the threshold value for "cases 2 and 3" from the threshold value storage unit 78. The W-LAN quality measurement unit 80 measures the RSSI of the W-LAN, and the first determination unit 86 determines whether the RSSI is smaller than the threshold value for "case 2" and the RTT for the W-LAN is greater than the threshold value. The second determination unit 88 then compares the threshold value for "case 3" with the EV-DO quality values measured by the EV-DO quality measurement unit 82. When one of the EV-DO quality values satisfies the threshold value, the switching from the EV-DO system to the W-LAN system is determined. Thereafter, the selector 90 selects the operation performed by the W-LAN communication unit 24.

According to the embodiment, the values of the transmission path qualities of the uplink line and the downlink line are measured. Therefore, the transmission path qualities can be accurately determined, even for a system, such as the cdma2000 1x-EV DO, in which signals transmitted uplink and downlink greatly differ. Since the transmission path quality value is measured by the EV-DO system for another purpose, the current system can be employed without being substantially altered. Further, a plurality of transmission path qualities are parameterized, and since these parameters are compared with the threshold values to determine the communication system to be used. Therefore, even in a different situation by changing the determination logic and the threshold value, the switching between the communication systems can be performed with a limited transmission path quality. Further, since a plurality of threshold values can be set, the switching of the communication systems can be enabled in consideration of the throughput values for the currently employed communication system and a switched communication system. Furthermore, by changing the determination logic, hysteresis can be provided for the switching and the communication system can be stabilized.

Second Embodiment

As well as the first embodiment, a second embodiment relates to a terminal device that employs one of a plurality of radio communication systems with switching one to another. In the second embodiment, instead of measuring the throughput values for the radio communication systems, predetermined values are employed as the first threshold value and the second threshold value. That is, regardless of the actual throughout values, throughput values are previously determined in order to simplify the processing.

While the terminal device 10 shown in FIG. 2 is appropriate for the second embodiment, the throughput measurement unit 74 is not required because the measurement of throughput values is not performed.

FIG. 9 is a diagram showing the data structure for stored throughput values according to the second embodiment. The throughput values are stored in the condition setting unit 76. The values of "throughputs" corresponding to "systems" are defined. However, the values of throughputs are determined as arbitrary values within an available range. The throughput values are not necessarily maximum throughput values. According to the data shown in FIG. 9, regardless of the actual throughput values, the W-LAN system is determined to be faster than the EV-DO system, and the EV-DO system is determined to be faster than the personal handyphone system.

The operation of the terminal device 10 according to the embodiment will now be described. It is assumed that the terminal device 10 is moved from the EV-DO area to the W-LAN area. When it is confirmed that the W-LAN communication unit 24 can receive a W-LAN signal, the condition setting unit 76 obtains the threshold values for "cases 2 and 3" from the threshold value storage unit 78. The W-LAN quality measurement unit 80 measures the RSSI of the W-LAN, and the first determination unit 86 determines that the RSSI is smaller than the threshold value for "case 2". The second determination unit 88 compares the EV-DO quality values measured by the EV-DO quality measurement unit 82 with the threshold value for "case 3", and when one of the EV-DO quality values satisfies the threshold value, the switching from the EV-DO system to the W-LAN is determined. The selector 90 then selects the operation performed by the W-LAN communication unit 24.

According to the embodiment, since values stored in advance are employed as throughput values, the processing can be simplified.

The present invention has been explained by referring to the embodiments. However, these embodiments are merely examples, and it can be understood by one having ordinary skill in the art that the component and process combinations can be variously modified, and that such modified combinations are also within the scope of this invention.

In the first and the second embodiments, the EV-DO quality measurement unit 82 obtains the five transmission path quality values, i.e., the SINR, the DRC information, the RSSI, the transmission output and the DRC Lock information as the values of the transmission path quality. The second determination unit 88 compares these values with the threshold values. However, only one of these values may be employed. In this case, the processing can be simplified, i.e., the type of the transmission path quality need only be selected in accordance with the required accuracy and the amount of processing that is permissible.

In the first and the second embodiments, the EV-DO quality measurement unit 82 obtains the five transmission path quality values, i.e., the SINR, the DRC information, the RSSI, the transmission output and the DRC Lock information as the values of the transmission path quality of the EV-DO system. Instead of obtaining these five values for the EV-DO system, the transmission path quality for the W-LAN may be obtained. That is, a high priority may be set for a communication system having a high throughput value. In this case, a switching process optimized for a communication system having a high throughput can be performed.

In the first and the second embodiments, the EV-DO system, the W-LAN and the personal handyphone systems have been employed as radio communication systems. However, the radio communications systems are not limited to these, and PDC (Personal Digital Cellular) or W-CDMA (Wideband CDMA) may be employed. In such a case, the quality measurement unit 82 need only measure the value of the transmission path quality that corresponds to a radio communication system for which a high priority is set, and this configuration can be applied for multiple radio communication systems.

According to the embodiments, a currently employed communication system can be switched to an appropriate one among a plurality of other radio communication systems on the basis of the transmission rate and the stability.

What is claimed is:

1. A terminal device using a plurality of wireless communication systems, the device comprising:
  a transmission path quality acquisition unit that acquires: a first transmission path quality of a first wireless communication system, which is a wireless communication system being used; and a second transmission path quality of a second wireless communication system, which is a wireless communication system to be used;
  a switching criterion determination unit that determines a plurality of switching criterions, wherein each of the plurality of switching criterions is determined based on all of the first transmission path quality, the second transmission path quality, and a communication method of the first wireless communication system; and
  a switching decision unit that decides whether to switch from the first wireless communication system to the second communication system, based on the determined switching criterion,
  wherein, when the communication method of the first wireless communication system is a predefined wireless communication method, the switching criterion determination unit determines that either a fast transmission switching criterion or a slow transmission switching criterion is employed based on a communication throughput of the second wireless communication system.

2. The terminal device according to claim 1, wherein, when the communication method of the first wireless communication system is not the predefined wireless communication method, the switching criterion determination unit determines the switching criterion based on a predetermined criterion.

3. The terminal device according to claim 1, wherein, when the communication throughput of the second wireless communication system is lower than the communication throughput of the first wireless communication system, the slow transmission switching criterion is employed.

4. The terminal device according to claim 1, wherein, when the communication throughput of the second wireless communication is higher than the communication throughput of the first wireless communication system, the fast transmission switching criterion is employed.

5. The terminal device according to claim 1, wherein the fast transmission switching criterion is configured to be easier than the slow transmission switching criterion to switch from the first wireless communication system to the second wireless communication system.

6. A terminal device using a plurality of wireless communication systems, the device comprising:
  a transmission path quality acquisition unit that acquires: a first transmission path quality of a first wireless communication system, which is a wireless communication system being used; and a second transmission path quality of a second wireless communication system, which is a wireless communication system to be used;
  a switching criterion determination unit that determines a plurality of switching criterions, wherein each of the plurality of switching criterions is determined based on all of the first transmission path quality, the second transmission path quality, and a communication method of the first wireless communication system; and
  a switching decision unit that decides whether to switch from the first wireless communication system to the second communication system, based on the determined switching criterion, wherein
  each of the plurality of switching criterions includes a plurality of sub-switching criterions,
  when the communication method of the first wireless communication system is a predefined wireless communication method, the switching decision unit decides to switch from the first wireless communication system to the second wireless communication system in case that at least one of the plurality of sub-switching criterions of the determined switching criterion is satisfied; and
  when the communication method of the first wireless communication system is not the predefined wireless communication method, the switching decision unit decides to switch from the first wireless communication system to the second wireless communication system in case that all of the plurality of sub-switching criterions are of the predetermined determined switching criterion are satisfied.

7. A communication system switching method comprising:
  acquiring a first transmission path quality of a first wireless communication system, which is a wireless communication system being used, and a second transmission path quality of a second wireless communication system, which is a wireless communication system to be used;
  determining a plurality of switching criterions, wherein each of the plurality of switching criterions is determined based on all of the first transmission path quality, the second transmission path quality, and a communication method of the first wireless communication system; and
  deciding whether to switch from the first wireless communication system to the second wireless communication system, based on the determined switching criterion,
  wherein, when the communication method of the first wireless communication system is a predefined wireless communication method, either a fast transmission switching criterion or a slow transmission switching criterion is determined to be employed based on a communication throughput of the second wireless communication system.

* * * * *